United States Patent
Choi et al.

(10) Patent No.: US 8,413,057 B2
(45) Date of Patent: Apr. 2, 2013

(54) REMOTE CONTROLLER SUPPORTING SYSTEM AND METHOD FOR HANDLING EVENT IN WEB ENVIRONMENT

(75) Inventors: Jun Kyun Choi, Daejeon (KR); Jinhong Yang, Daejeon (KR); Hyojin Park, Daejeon (KR); Kyong-Il Cho, Gyeonggi-do (KR); Sun-Joong Kim, Daejeon (KR); Kee Seong Cho, Daejeon (KR); Won Ryu, Daejeon (KR)

(73) Assignees: Korea Advanced Institute of Science and Technology, Daejeon (KR); Electronics and Telecommunications Research Institute, Daejeon (KR)

( * ) Notice: Subject to any disclaimer, the term of this patent is extended or adjusted under 35 U.S.C. 154(b) by 462 days.

(21) Appl. No.: 12/694,446

(22) Filed: Jan. 27, 2010

(65) Prior Publication Data
US 2011/0072358 A1 Mar. 24, 2011

(30) Foreign Application Priority Data

Sep. 21, 2009 (KR) .................. 10-2009-0089269
Nov. 6, 2009 (KR) .................. 10-2009-0106863

(51) Int. Cl.
*G06F 3/00* (2006.01)
(52) U.S. Cl. .................. 715/740; 345/169; 348/114
(58) Field of Classification Search .................. 715/740; 345/169; 348/114; 340/815
See application file for complete search history.

(56) References Cited

U.S. PATENT DOCUMENTS

| 5,940,074 | A | * | 8/1999 | Britt et al. ...................... 715/749 |
| 6,034,689 | A | * | 3/2000 | White et al. .................. 715/854 |
| 6,104,334 | A | * | 8/2000 | Allport .......................... 341/175 |
| 6,772,394 | B1 | * | 8/2004 | Kamada ......................... 715/210 |
| 2003/0156053 | A1 | * | 8/2003 | Wall et al. ...................... 341/176 |
| 2006/0259864 | A1 | * | 11/2006 | Klein et al. ................... 715/738 |
| 2010/0079680 | A1 | * | 4/2010 | White et al. .................. 348/734 |
| 2010/0123834 | A1 | * | 5/2010 | Brodersen et al. ............ 348/734 |
| 2010/0229194 | A1 | * | 9/2010 | Blanchard et al. ............. 725/39 |

FOREIGN PATENT DOCUMENTS

KR 10-2003-0031548 A 4/2003

* cited by examiner

*Primary Examiner* — Tuyetlien Tran
*Assistant Examiner* — Rashedul Hassan
(74) *Attorney, Agent, or Firm* — Pearne & Gordon LLP

(57) ABSTRACT

Provided is a system and method that may perform various operations on a website according to combinations of buttons on a remote controller. A system for supporting a remote controller may include: a profile storage unit to store a plurality of profiles containing functions of the remote controller and information associated with the functions of the remote controller; a receiver to receive an input signal from the remote controller, and to interpret an event of the input signal based on a profile corresponding to the remote controller; and a presentation unit to access a web server, to transform, to a predetermined behavior, at least one event interpreted by the receiver, and to request the web server for an operation corresponding to the behavior.

18 Claims, 6 Drawing Sheets

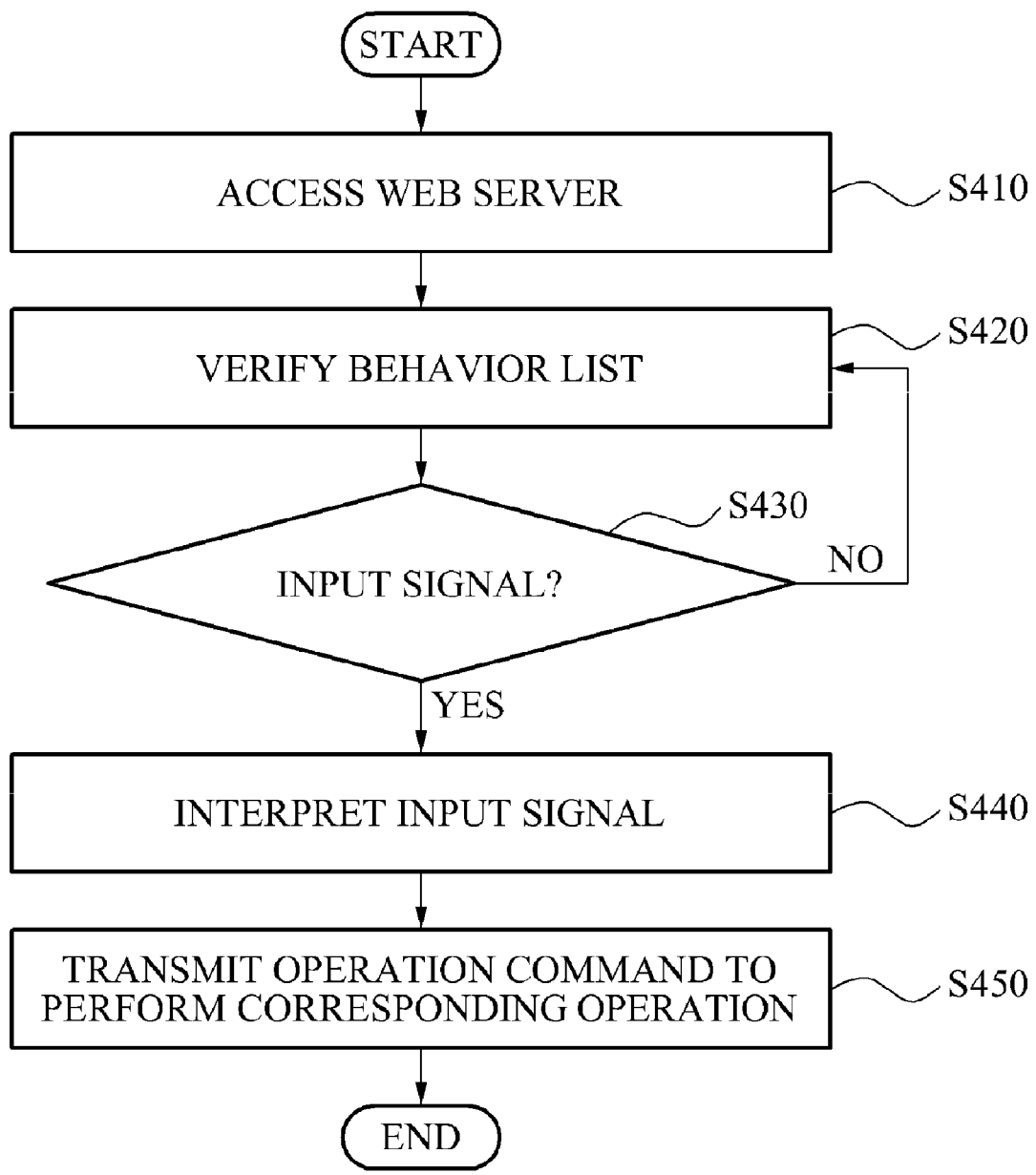

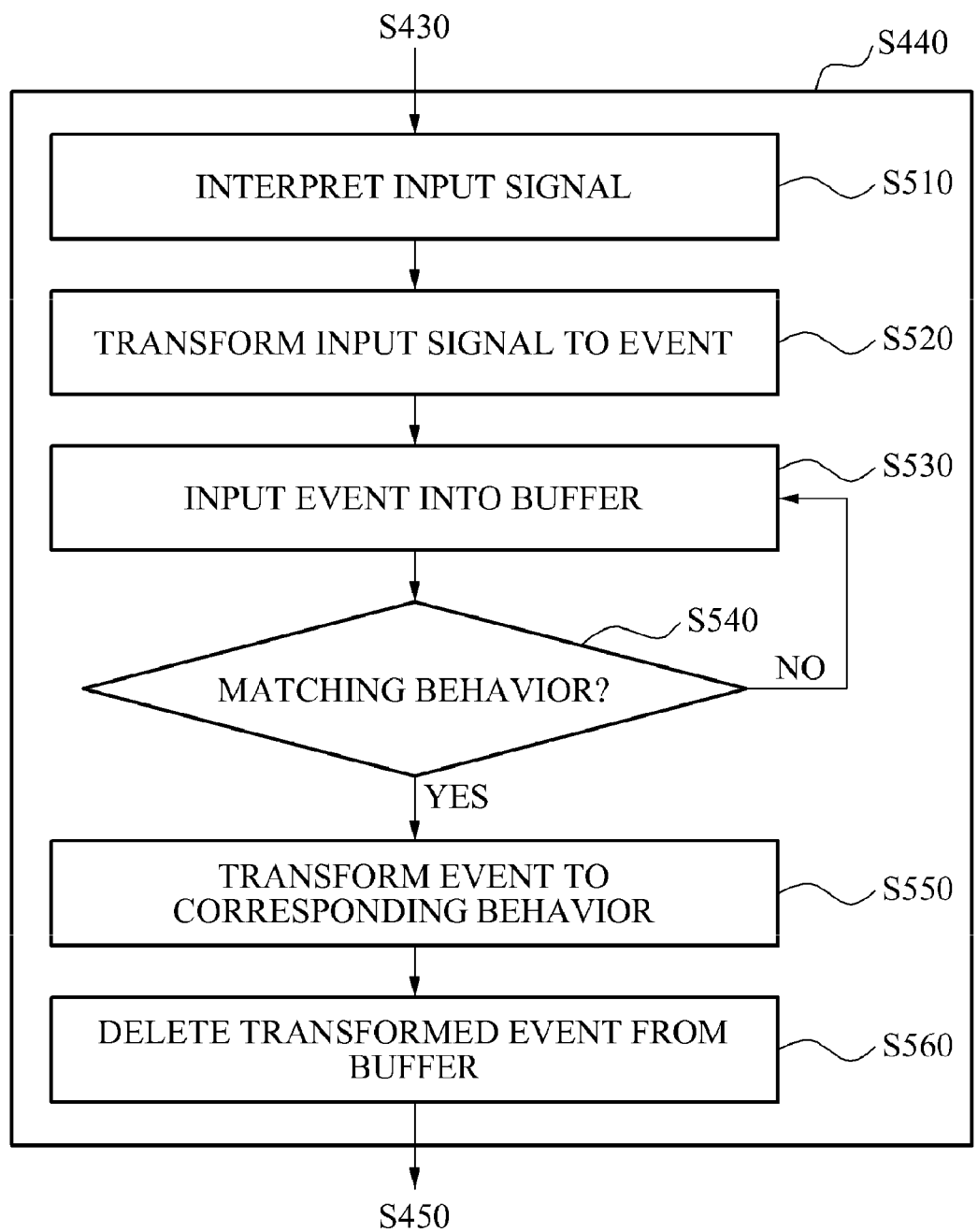

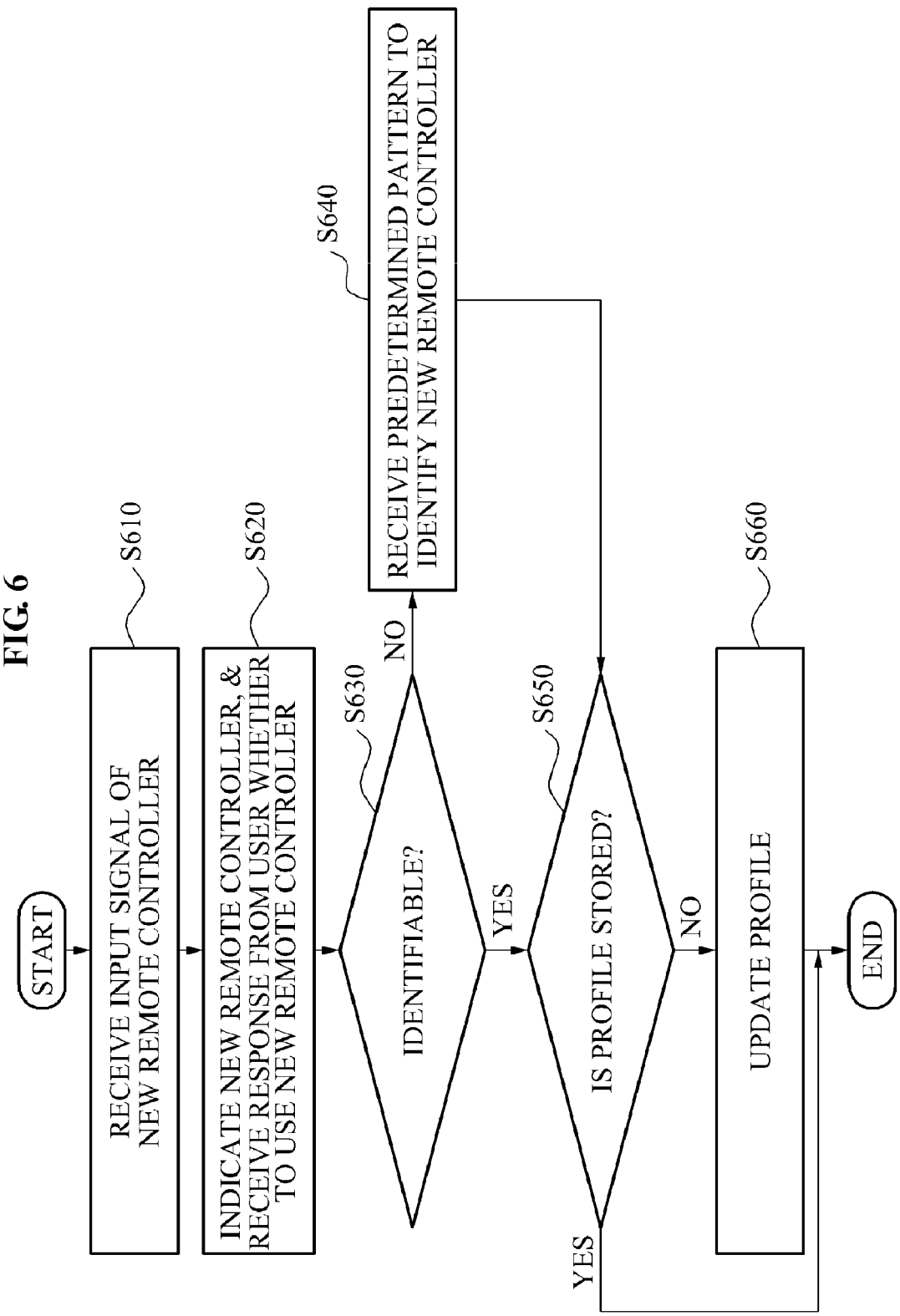

REMOTE CONTROLLER SUPPORTING SYSTEM AND METHOD FOR HANDLING EVENT IN WEB ENVIRONMENT

CROSS-REFERENCE TO RELATED APPLICATIONS

This application claims the benefit of Korean Patent Application No. 10-2009-0089269, filed on Sep. 21, 2009, and Korean Patent Application No. 10-2009-0106863, filed on Nov. 6, 2009, in the Korean Intellectual Property Office, the disclosures of which are incorporated herein by reference.

BACKGROUND

1. Field of the Invention

The present invention relates to a system and method that may combine types of input buttons on a remote controller in various sequences to generate a behavior list, and may perform a corresponding operation when a user pushes a predetermined button based on a type and a sequence set in the behavior list, and thereby may enable the user to execute the user's desired operation on a website using a general remote controller.

2. Description of the Related Art

With developments of networks and displays such as a television (TV), an Internet Protocol TV (IPTV) and products enabling a user to check websites even on a TV screen have appeared.

Since a website is optimized in an input device for a computer using a keyboard and a mouse, it is difficult to input an operation desired by a user using an input device for a TV such as a remote controller.

In addition, the input device for the TV such as the remote controller does not employ the same buttons or input signals as a keyboard or a mouse, uses different buttons for each product, and transmits different input signals. Thus, a standardization becomes an issue.

Accordingly, there is a need for a system and method that enables a user to readily input the user's desired operation in an input device for a TV such as a remote controller, and may be compatible with various remote controllers.

SUMMARY

An aspect of the present invention provides a system and method that may enable a user to execute the user's desired operation on a website using a general remote controller by combining types of input buttons on a remote controller in various sequences to generate a behavior list, and by performing a corresponding operation when the user pushes a predetermined button based on a type and a sequence set in the behavior list.

Another aspect of the present invention also provides a system and method that may be compatible with functions of various remote controllers by generating, into a file, functions of the various remote controllers and information associated with the functions, by storing the file, and by interpreting an input signal transmitted from each of the remote controllers based on the file.

Another aspect of the present invention also provides a system and method that may be compatible with functions of a new remote controller when the new remote controller is released by generating, into a file, functions of various remote controllers and information associated with the functions, by storing the file, and by accessing an external storage medium over a network to update the file.

According to an aspect of the present invention, there is provided a system for supporting a remote controller, the system including: a profile storage unit to store a plurality of profiles containing functions of the remote controller and information associated with the functions of the remote controller; a receiver to receive an input signal from the remote controller, and to interpret an event of the input signal based on a profile corresponding to the remote controller; and a presentation unit to access a web server, to transform, to a predetermined behavior, at least one event interpreted by the receiver, and to request the web server for an operation corresponding to the behavior.

The presentation unit may include: an event unit to manage the at least one event interpreted by the receiver; a storage unit to store a behavior list containing behaviors and at least one event corresponding to each of the behaviors; a buffer to sequentially receive and store the at least one event from the event unit; and an interpreter to verify whether a behavior matching the at least one event exists in the behavior list by comparing the at least one event stored in the buffer with the behavior list, and to transform the matching at least one event to the verified behavior when the behavior matching the at least one event matches is included in the behavior list.

The remote controller supporting system may further include a profile updater to access an external storage medium storing a new profile to download the new profile, and to store the downloaded new profile in the profile storage unit.

According to another aspect of the present invention, there is provided a method of supporting a remote controller, the method including: accessing a web server; verifying a behavior list available in the web server; receiving an input signal from the remote controller; interpreting the input signal using the verified behavior list to verify a behavior requested by a user; and transmitting an operation command corresponding to the verified behavior to the web server so that the web server performs a corresponding operation.

The interpreting and the verifying may include: interpreting the received input signal; transforming the input signal to an event based on the interpretation result; sequentially inputting and storing the event in a buffer; comparing at least one event stored in the buffer with the behavior list to verify whether a behavior matching the at least one event is included in the behavior list; and transforming the verified at least one event to the corresponding behavior.

According to embodiments of the present invention, it is possible to enable a user to execute the user's desired operation on a website using a general remote controller by combining types of input buttons on a remote controller in various sequences to generate a behavior list, and by performing a corresponding operation when the user pushes a predetermined button based on a type and a sequence set in the behavior list.

Also, according to embodiments of the present invention, it is possible to be compatible with functions of various remote controllers by generating, into a file, functions of the various remote controllers and information associated with the functions, by storing the file, and by interpreting an input signal transmitted from each of the remote controllers based on the file.

Also, according to embodiments of the present invention, it is possible to be compatible with functions of a new remote controller when the new remote controller is released by generating, into a file, functions of various remote controllers and information associated with the functions, by storing the file, and by accessing an external storage medium over a network to update the file.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 is a flowchart illustrating a method of supporting a remote controller according to an embodiment of the present invention;

FIG. 5 is a flowchart illustrating an operation of interpreting an input signal of FIG. 4; and FIG. 6 is a flowchart illustrating a method of recognizing, by a remote controller supporting system, a new remote controller according to an embodiment of the present invention.

DETAILED DESCRIPTION

Figure 1:
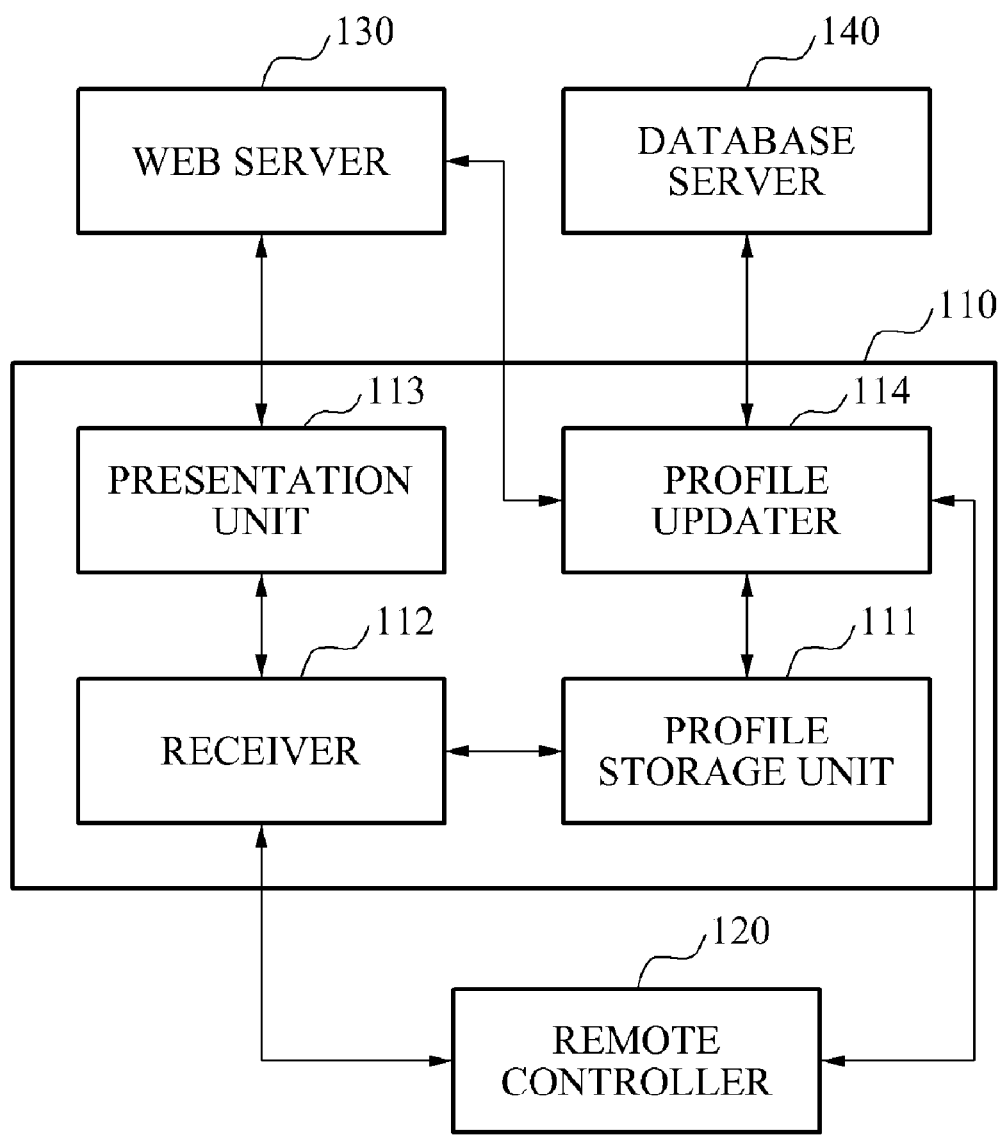
FIG. 1 is a block diagram illustrating a system for supporting a remote controller according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

According to embodiments of the present invention, it is possible to enable a user to execute the user's desired operation on a website using a general remote controller by combining types of input buttons on a remote controller in various sequences to generate a behavior list, and by performing a corresponding operation when the user pushes a predetermined button based on a type and a sequence set in the behavior list.

FIG. 1 is a block diagram illustrating a system 110 for supporting a remote controller 120 according to an embodiment of the present invention.

As shown in FIG. 1, the remote controller supporting system 110 may include a profile storage unit 111, a receiver 112, a presentation unit 113, and a profile updater 114.

The profile storage unit 111 may include a plurality of profiles containing functions and information associated with the functions of the remote controller 120.

Each of the profiles may include functions of a remote controller of a different type and information associated with the functions.

The receiver 112 may receive an input signal from the remote controller 120, and interpret an event of the input signal based on a profile corresponding to the remote controller 120.

Specifically, when the receiver 112 receives the input signal from the remote controller 120, the receiver 112 may identify a type of the remote controller 120 based on the received input signal, retrieve the profile corresponding to the remote controller 120 from the profile storage unit 111, and interpret the event of the input signal based on the retrieved profile corresponding to the remote controller 120.

When the receiver 112 may not identify the type of the remote controller 120 based on the received input signal, the receiver 112 may receive, from a user, a predetermined pattern with respect to the remote controller 112.

When the profile corresponding to the remote controller 120 does not exist in the profile storage unit 111, the receiver 112 may execute the profile updater 114 to store a new profile corresponding to the remote controller 120 in the profile storage unit 111.

The presentation unit 113 may access a web server 130 to display a webpage, may transform, to a predetermined behavior, at least one event interpreted by the receiver 112, and may transmit an operation command corresponding to the behavior to the web server 130 to perform a corresponding operation on the webpage.

Figure 2:
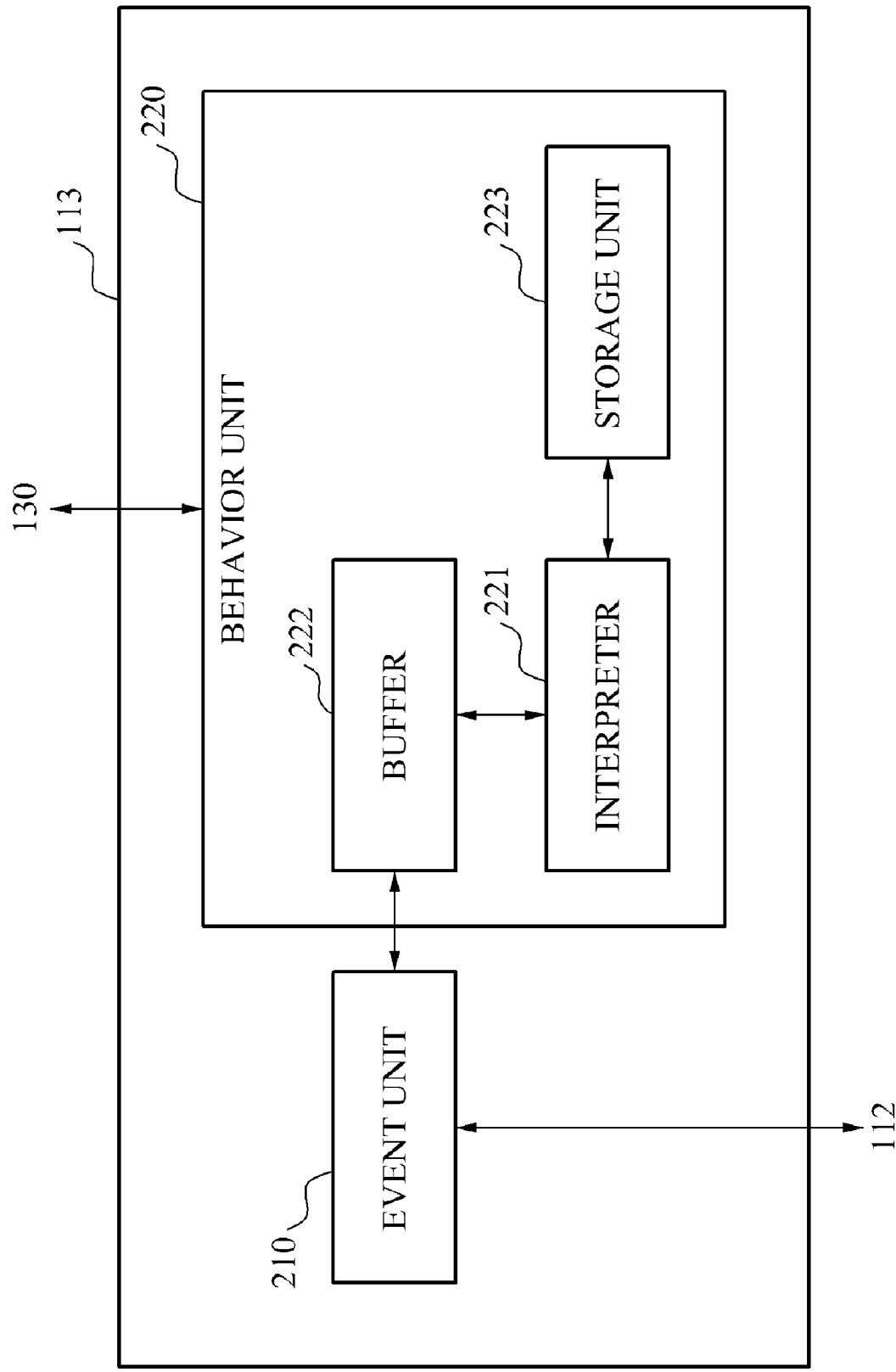
FIG. 2 is a block diagram illustrating a configuration of a presentation unit of FIG. 1.

For example, the presentation unit 113 may store the verified behavior in a storage unit 223 of FIG. 2, periodically perform polling with respect to behaviors stored in the storage unit 223, and transmit, to the web server 130, an operation command corresponding to the polled behavior.

A configuration and an operation of the presentation unit 113 will be further described with reference to FIG. 2.

According to a request of the receiver 112, the profile updater 114 may access an external storage medium storing a new profile to download the new profile, and may store the downloaded new profile in the profile storage unit 111. In this instance, the profile updater 114 may select and access at least one of external storage media based on the identified remote controller type.

The external storage medium storing the new profile may correspond to one of a storage unit of the remote controller 120, the web server 130, and a database server 140. For example, the remote controller 120 may store its own profile in the storage unit of the remote controller 120. The web server 130 may store profiles with respect to remote controllers supportable over the webpage. The database server 140 may exclusively store the profiles.

FIG. 2 is a block diagram illustrating a configuration of the presentation unit 113 of FIG. 1.

As shown in FIG. 2, the presentation unit 113 may include an event unit 210 and a behavior unit 220.

The event unit 210 may store and manage an event interpreted by the receiver 112.

Specifically, the event unit 210 may store, in an inner storage unit, a name of the event interpreted by the receiver 112 and a value of the event.

The behavior unit 220 may transform, to a predetermined behavior, at least one event stored in the event unit 210, and may request the web server 130 for an operation corresponding to the transformed behavior.

The behavior unit 220 may include an interpreter 221, a buffer 222, and a storage unit 223.

The buffer 222 may sequentially receive an event from the event unit 210 and store the received event in a received sequence. The event unit 210 may transmit the event to the buffer 222 in an interpreted sequence of the receiver 112.

The storage unit 223 may store a behavior list and behaviors transformed by the interpreter 221. The behavior list may include behaviors and at least one event corresponding to each of the behaviors.

The interpreter 221 may compare the at least one event stored in the buffer 222 with the behavior list. When the behavior list includes a behavior matching the at least one event, the interpreter 221 may transform the at least one event to the corresponding behavior. The interpreter 221 may transform N events to M behaviors. Here, N and M denote different integers.

The interpreter 221 may delete, from the buffer 222, the at least one event transformed to the corresponding behavior, and thereby may prevent a portion of the transformed at least one event from combining with another event and being transformed to another behavior.

When the presentation unit 113 is connected to the web server 130, the interpreter 221 may retrieve and load, from the storage unit 223, a behavior list used in the web server 230, and may compare the loaded behavior list with at least one event stored in the buffer 222.

The webpage of the web server 130 connected by the interpreter 221 may include a document in a JavaScript format performing an operation according to a request of the behavior unit 220.

The interpreter 221 may interpret a HyperText Markup Language (HTML) and a Cascading Style Sheet (CSS) of the webpage to process a corresponding event.

Figure 3:
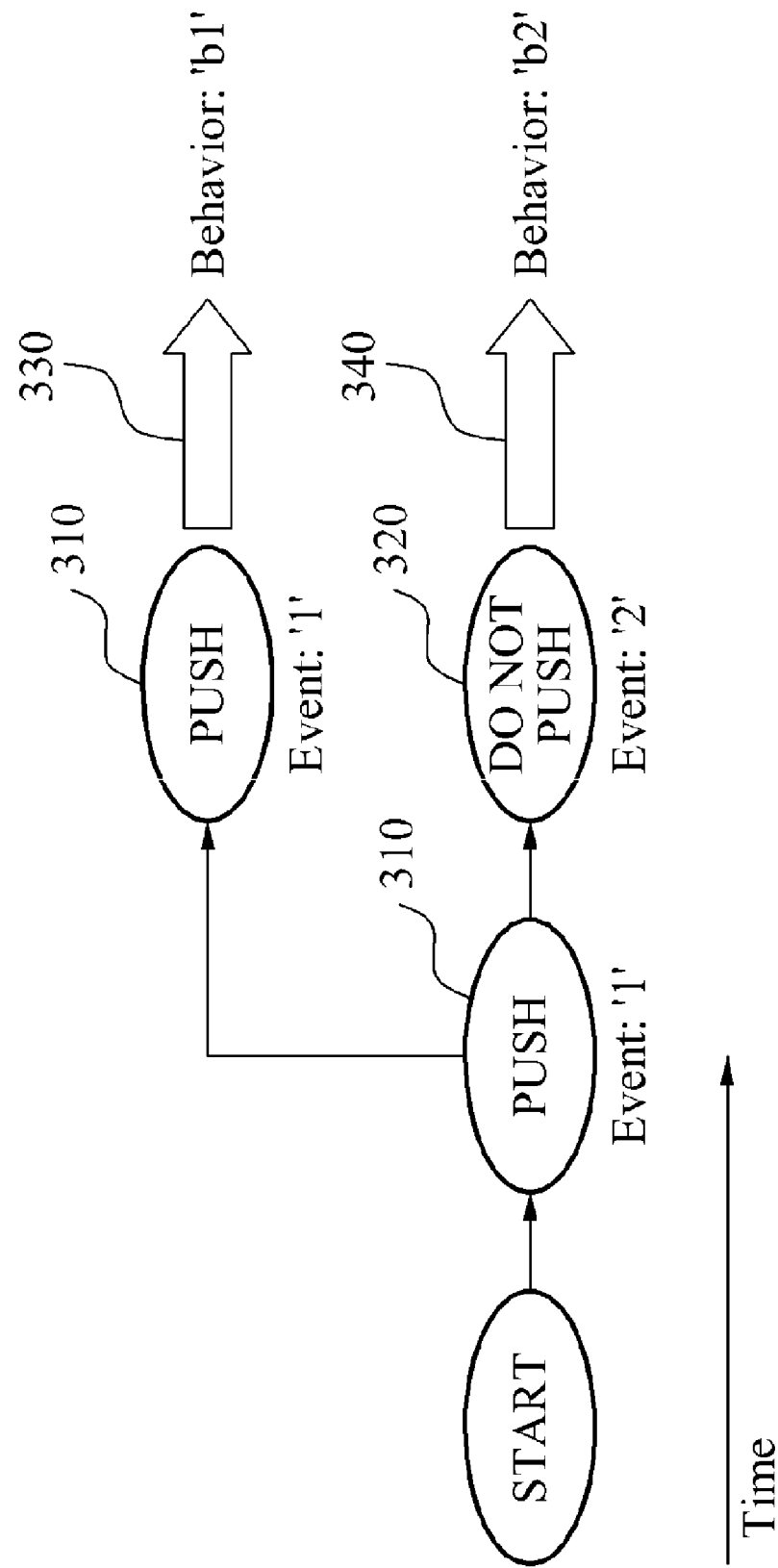
FIG. 3 is a diagram illustrating a difference between a behavior and an event used in the remote controller supporting system of FIG. 1 according to an embodiment of the present invention.

FIG. 3 is a diagram illustrating a difference between a behavior and an event used in the remote controller supporting system 110 according to an embodiment of the present invention.

Referring to FIG. 3, when a predetermined key is being pushed during a predetermined period of time, the remote controller supporting system 110 may set a corresponding behavior 1 to b1. When the predetermined key is pushed only once, the remote controller supporting system 110 may set a corresponding behavior 2 to b2.

When the user pushes the predetermined key of the remote controller 120, the receiver 112 receiving an input signal may interpret an event (1) 310 indicating the predetermined key is pushed, and may transfer the interpretation result to the event unit 210. The event unit 210 may store the event (1) 310 in the buffer 222.

In this example, when the user keeps pushing the predetermined key, the receiver 112 receiving the input signal may interpret the event (1) 310 indicating the predetermined key is pushed, and may continuously transfer the interpretation result to the event unit 210. The event unit 210 may continuously store the event (1) 310 in the buffer 222. In this instance, when the event (1) 310 is continuously stored in the buffer 222 more than a predetermined number of times, the interpreter 221 may determine the user is pushing the predetermined key during the predetermined period of time and thereby transform the event (1) 310 to behavior 1 (b1) as indicated by an arrow 330.

When the user takes a finger off from the predetermined key of the remote controller 120, the receiver 112 receiving an input signal may interpret an event (2) 320 indicating the predetermined key is not pushed, and transfer the interpretation result to the event unit 210. The event unit 210 may store, in the buffer 222, the event (2) 320 after the event (1) 310. In this instance, when the event (1) 310 and the event (2) 320 are sequentially stored in the buffer 222, the interpreter 221 may determine the predetermined key is pushed only once and thereby may transform the event (1) 310 and the event (2) 320 to behavior 2 (b2) as indicated by an arrow 340.

FIG. 4 is a flowchart illustrating a method of supporting the remote controller 120 according to an embodiment of the present invention.

In operation S410, the presentation unit 113 may access the web server 130 according to a user request.

In operation S420, the presentation unit 113 may verify a behavior list available in the web server 130.

In operation S430, the receiver 112 may verify whether an input signal is received from the remote controller 120. When the input signal is not received, the receiver 112 may be in an idle state.

In operation S440, the presentation unit 113 may interpret the received input signal to verify a behavior requested by the user using the behavior list. In this instance, the presentation unit 113 may store the verified behavior in the storage unit 223.

Operation S440 of interpreting the input signal will be further described with reference to FIG. 5.

In operation S450, the presentation unit 113 may transmit an operation command corresponding to the verified behavior to the web server 130 to perform a corresponding operation in the webpage. The presentation unit 113 may periodically perform polling with respect to behaviors stored in the storage unit 223, and may transmit, to the web server 130, an operation corresponding to the polled behavior.

FIG. 5 is a flowchart illustrating operation S440 of interpreting the input signal of FIG. 4. Operation S510 through S560 may be included in operation S440.

In operation S510, the receiver 112 may identify a type of the remote controller 120 based on the received input signal, may retrieve, from the profile storage unit 111, a profile corresponding to the identified type of the remote controller 120, and may interpret an event of the input signal based on the retrieved profile.

In operation S520, the receiver 112 may transform the received input signal to an event based on the interpreted event of the input signal, and store the transformed event in the event unit 210.

In operation S530, the event unit 210 may sequentially input the stored event into the buffer 222.

In operation S540, the interpreter 221 may compare at least one event stored in the buffer 222 with the verified behavior list, and may verify whether the behavior list includes a behavior matching the at least one event.

In operation S550, the interpreter 221 may transform, to the corresponding behavior, the at least one event verified to match the behavior.

The interpreter 221 may store the transformed behavior in the storage unit 223.

In operation S560, the interpreter 221 may delete, from the buffer 222, the at least one event transformed to the behavior.

FIG. 6 is a flowchart illustrating a method of recognizing, by the remote controller supporting system 110, a new remote controller according to an embodiment of the present invention.

FIG. 6 illustrates a process of recognizing, by the remote controller supporting system 110, the remote controller 120 when the remote controller supporting system 110 initially accesses the remote controller 120, or when a user desires to use the new remote controller in the remote controller supporting system 110.

In operation S610, the receiver 112 may receive an input signal of the new remote controller.

In operation S620, when the input signal is not transmitted from the existing remote controller 120, the receiver 112 may indicate the new remote controller, and may receive a response from the user about whether to use the new remote controller.

In operation S630, the receiver 112 may verify whether a type of the new remote controller is identifiable based on the received input signal.

When the type of the new remote controller is unidentifiable, the receiver 112 may request the user for a predetermined pattern to identify the new remote controller, and may receive the predetermined pattern from the user in operation S640. The receiver 112 may identify the type of the new remote controller based on the predetermined pattern received from the user.

In operation S650, the receiver 112 may verify whether a profile corresponding to the identified type of the new remote controller is stored in the profile storage unit 111. When the corresponding profile is stored in the profile storage unit 111, the receiver 112 may perform operation S510 of interpreting the input signal based on the profile.

When the corresponding profile is not stored in the profile storage unit 111, the receiver 112 may execute the profile updater 114 to update a new profile corresponding to the new remote controller to the profile storage unit 111 in operation S660.

The profile updater 114 may select and access at least one of external storage media storing profiles based on the identified type of the new remote controller, download the new profile corresponding to the new remote controller, and store the downloaded new profile in the profile storage unit 111.

As described above, according to an embodiment of the present invention, it is possible to enable a user to execute the user's desired operation on a website using a general remote controller by combining types of input buttons on a remote controller in various sequences to generate a behavior list, and by performing a corresponding operation when the user pushes a predetermined button based on a type and a sequence set in the behavior list. For example, when it is possible to enable a screen to be zoomed in when a predetermined button of the remote controller is pushed a predetermined number of times, and to enable the predetermined button to indicate different images on a map-related screen.

Also, it is possible to be compatible with functions of various remote controllers by generating, into a file, functions of the various remote controllers and information associated with the functions, by storing the file, and by interpreting an input signal transmitted from each of the remote controllers based on the file.

Also, it is possible to be compatible with functions of a new remote controller when the new remote controller is released by generating, into a file, functions of various remote controllers and information associated with the functions, by storing the file, and by accessing an external storage medium over a network to update the file.

The remote controller supporting method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system for supporting a remote controller, the system comprising:
    a profile storage unit to store a plurality of profiles containing functions of the remote controller and information associated with the functions of the remote controller;
    a receiver to receive an input signal from the remote controller, and to interpret an event of the input signal based on a profile corresponding to the remote controller; and
    a presentation unit to access a web server, to transform, to a predetermined behavior, at least one event interpreted by the receiver, and to request the web server for an operation corresponding to the predetermined behavior;
    wherein the presentation unit further comprises:
    a storage unit to store a behavior list containing behaviors and at least one event corresponding to each of the behaviors;
    an interpreter to verify whether a behavior matching the at least one event exists in the behavior list by comparing the at least one event with the behavior list, and to transform said matching the at least one event to said verified behavior when the behavior matching the at least one event is included in the behavior list,
    wherein, when the presentation unit is connected to the web server, the interpreter retrieves, from the storage unit, a behavior list available in the web server to load said retrieved behavior list.

2. The system of claim 1, wherein the presentation unit further comprises:
    an event unit to manage the at least one event interpreted by the receiver; and
    a buffer to sequentially receive and store the at least one event from the event unit.

3. The system of claim 2, wherein the interpreter deletes, from the buffer, the at least one event transformed to the behavior.

4. The system of claim 2,
    wherein the at least one event comprises: at least a first event and a second event,
    wherein the receiver interprets a first input signal of the remote controller as the first event and the second input signal of the remote controller as the second event,
    wherein the first and second events are managed by the event unit and stored in the buffer sequentially relative to one another,
    wherein the interpreter of the presentation unit verifies that the first event and the second event match the predetermined behavior based on the behavior list, and
    wherein the predetermined behavior associated with both the first event and the second event is different than a first behavior associated with the first event and a second behavior associated with the second event.

5. The system of claim 4,
    wherein the presentation unit selects the predetermined behavior based, at least in part, on the presentation unit being connected to the web server,
    wherein the presentation unit selects the first behavior and the second behavior based, at least in part, on the presentation unit not being connected to the web server, and
    wherein the second event is performed during a predetermined period of time after the first event.

6. The system of claim 1, further comprising:
    a profile updater to access an external storage medium storing a new profile to download the new profile, and to store the downloaded new profile in the profile storage unit.

7. The system of claim 6, wherein:
the receiver identifies the type of remote controller based on the input signal, and
when the type of remote controller is unidentifiable based on the input signal, the receiver receives a predetermined pattern from a user to identify the type of remote controller.

8. The system of claim 7, wherein:
the receiver retrieves a profile corresponding to the identified type of remote controller from the profile storage unit, and
when the profile corresponding to the identified type of remote controller does not exist in the profile storage unit, the receiver executes the profile updater to store a new profile corresponding to the type of remote controller in the profile storage unit.

9. The system of claim 7, wherein the external storage medium storing the new profile corresponds to one of a storage unit of the remote controller, the web server, and a profile storage database server.

10. A method of supporting a remote controller, the method comprising:
accessing a web server;
retrieving a behavior list from the web server;
verifying the behavior list available in the web server;
receiving an input signal from the remote controller;
interpreting the input signal using the verified behavior list to verify a behavior requested by a user; and
transmitting an operation command corresponding to the verified behavior to the web server so that the web server performs a corresponding operation.

11. The method of claim 10, wherein the behavior list includes a behavior operable in the web server, and includes at least one event corresponding to the behavior.

12. The method of claim 11, wherein the interpreting and the verifying comprises:
interpreting the received input signal;
transforming the input signal to an event based on the interpretation result;
sequentially inputting and storing the event in a buffer;
comparing at least one event stored in the buffer with the behavior list to verify whether a behavior matching the at least one event is included in the behavior list; and
transforming the verified at least one event to the corresponding behavior.

13. The method of claim 12, wherein the interpreting and the verifying further comprises:
deleting, from the buffer, the at least one event transformed to the behavior.

14. The method of claim 12, wherein the interpreting comprises:
identifying a type of the remote controller based on the input signal;
retrieving a profile corresponding to the remote controller based on the identified type of the remote controller; and
interpreting an event of the input signal based on the retrieved profile.

15. The method of claim 14, wherein the interpreting further comprises:
accessing an external storage medium storing the profile corresponding to the remote controller to download and store the profile corresponding to the remote controller when the profile corresponding to the remote controller is not retrieved; and
downloading and storing the profile corresponding to the remote controller.

16. The method of claim 15, wherein the external storage medium storing the new profile corresponds to one of a storage unit of the remote controller, the web server, and a profile storage database server.

17. The method of claim 14, wherein the interpreting further comprises:
verifying whether the input signal is transmitted from an existing remote controller;
verifying whether a type of a new remote controller is identifiable based on the input signal when the input signal is not transmitted from the existing remote controller;
receiving, from a user, a predetermined pattern to identify the new remote controller when the type of the new remote controller is unidentifiable; and
identifying the type of the new remote controller based on the predetermined pattern.

18. The method of claim 12,
wherein said comparing of at least one event comprises comparing a first event and a second event with the behavior list,
wherein said transforming the verified at least one event comprises: transforming the first event and the second event into a corresponding behavior, and
wherein the corresponding behavior associated with both the first event and the second event is different than a first behavior associated with the first event and a second behavior associated with the second event.

* * * * *